(12) United States Patent
Shao

(10) Patent No.: US 9,319,617 B2
(45) Date of Patent: Apr. 19, 2016

(54) METHOD AND DEVICE FOR DISPLAYING VIDEO ON MOBILE TERMINAL

(75) Inventor: Kunlin Shao, Shenzhen (CN)

(73) Assignee: ZTE CORPORATION (CN)

( * ) Notice: Subject to any disclaimer, the term of this patent is extended or adjusted under 35 U.S.C. 154(b) by 0 days.

(21) Appl. No.: 14/394,814

(22) PCT Filed: Jun. 29, 2012

(86) PCT No.: PCT/CN2012/077906
§ 371 (c)(1),
(2), (4) Date: Oct. 16, 2014

(87) PCT Pub. No.: WO2013/131341
PCT Pub. Date: Sep. 12, 2013

(65) Prior Publication Data
US 2015/0092107 A1 Apr. 2, 2015

(30) Foreign Application Priority Data

Mar. 8, 2012 (CN) .......................... 2012 1 0059434

(51) Int. Cl.
*H04N 13/00* (2006.01)
*H04N 15/00* (2006.01)
(Continued)

(52) U.S. Cl.
CPC ..... *H04N 5/44513* (2013.01); *H04N 21/41407* (2013.01); *H04N 21/42201* (2013.01); *H04N21/4312* (2013.01); *H04N 21/4355* (2013.01); *H04N 21/4356* (2013.01); *H04N 21/84* (2013.01); *H04N 2005/4453* (2013.01); *H04N 2005/44526* (2013.01)

(58) Field of Classification Search
CPC .......... H04N 13/0011; H04N 13/0022; H04N 13/0055; H04N 13/0497; H04N 13/0239; G06T 7/0075; G06T 19/00; G06T 15/20; G09G 5/363; G09G 2340/0407

USPC .......... 348/43, 51, 46, 42, 54, 135, 561, 581, 348/333.12; 345/419, 519, 173, 427, 660
See application file for complete search history.

(56) References Cited

U.S. PATENT DOCUMENTS 8,149,277 B2 *  4/2012  Mitsuhashi ............ G09G 5/003
                                                              348/135
9,088,771 B2 *  7/2015  Jung .................. H04N 13/0011
(Continued)

FOREIGN PATENT DOCUMENTS

CN          1374803 A      10/2002
CN        101071562 A      11/2007
(Continued)

OTHER PUBLICATIONS

International Search Report for corresponding application PCT/CN2012/077906 filed Jun. 29, 2012; Mail date Dec. 13, 2013.
(Continued)

*Primary Examiner* — Trang U Tran
(74) *Attorney, Agent, or Firm* — Cantor Colburn LLP

(57) ABSTRACT

Disclosed are a method and a device for displaying a video on a mobile terminal. The method comprises: a distance between a display screen of the mobile terminal which is displaying the video and human eyes watching the video being displayed on the mobile terminal is acquired; and according to the acquired distance, the caption font size of the video being displayed on the mobile terminal is adjusted, wherein the caption font size and the acquired distance are in a progressive increase relationship. The technical solution provided in the disclosure achieves the effect that the change in the distance between a display screen of the mobile terminal and a user does not influence the user when watching a caption in a video being displayed on the mobile terminal, and the user experience is friendly.

10 Claims, 6 Drawing Sheets

(51) Int. Cl.
*H04N 5/445* (2011.01)
*H04N 21/414* (2011.01)
*H04N 21/422* (2011.01)
*H04N 21/435* (2011.01)
*H04N 21/431* (2011.01)
*H04N 21/84* (2011.01)

(56) References Cited

U.S. PATENT DOCUMENTS

2003/0234799 A1* 12/2003 Lee .................. G06F 3/1407
                                                    345/660
2005/0030322 A1   2/2005 Gardos 2011/0084897 A1   4/2011 Manoharan
2013/0010062 A1*  1/2013 Redmann ............ H04N 13/007
                                                    348/43

FOREIGN PATENT DOCUMENTS

| | | |
|---|---|---|
| CN | 101518055 A | 8/2009 |
| CN | 101808221 A | 8/2010 |
| CN | 101437121 A | 5/2014 |
| KR | 1020120014434 A | 2/2012 |

OTHER PUBLICATIONS

European Search Report for corresponding application EP12870753; Report dated Oct. 8, 2015.

* cited by examiner

METHOD AND DEVICE FOR DISPLAYING VIDEO ON MOBILE TERMINAL

TECHNICAL FIELD

The disclosure relates to the field of communications, and in particular to a method and a device for displaying video on a mobile terminal.

BACKGROUND

With the rapid development of mobile terminal hardware technologies, more and more new functions with novelty and creativity are introduced in the field of mobile terminals, so as to enhance the availability and entertainment of mobile phones, and bring richer operation experiences and enjoyment to the users. The function of proximity sensing is one of the new functions. In order to realise the proximity sensing function, firstly, a proximity sensor, also referred to as a displacement sensor, needs to be implanted into the mobile terminal, which, in normal situations, is arranged at the two sides or in a groove of the mobile phone receiver. The principle thereof lies in calculating, through acquiring the physical variations of the monitored object, the distance from the sensor to the detected object.

At present, the hardware support for mobile terminals is upgraded gradually, and the multimedia experience of the user is also developing towards the direction of diversification; especially, file formats applicable for a video player have converted from the traditional lower-resolution formats such as .3gp, and .flv, to file formats which may play various types of files of high-definition or super-definition formats such as .avi and .mkv. The above-mentioned file types generally adopt the approach that the video file and caption file are separately processed, thus, when the video is played, if the mobile phone screen is placed too far, the caption or voice of the video will appear or sound relatively small; and if the mobile phone screen is placed too close, the caption or voice will appear or sound too big.

Therefore, in the traditional art, there is no such solution that the caption on the display screen of the mobile terminal or the voice from the mobile terminal may be adjusted adaptively with the change of the distance between the user and the display screen of the mobile terminal when the user watches the video on the mobile terminal.

SUMMARY

The disclosure provides a method and a device for displaying a video being displayed on a mobile terminal, so as to at least solve the problem in the traditional art that the caption on the display screen of the mobile terminal may not be adjusted adaptively with the change of the distance between the user and the display screen of the mobile terminal when the user watches the video on the mobile terminal.

According to one aspect of the disclosure, a method for displaying a video being displayed on a mobile terminal is provided.

The method for displaying the video being displayed on the video being displayed on the mobile terminal according to the disclosure comprises: acquiring a distance between a display screen of the mobile terminal which is displaying the video and human eyes watching the video being displayed on the mobile terminal; and adjusting a caption font size of the video being displayed on the mobile terminal according to the acquired distance, wherein the caption font size and the acquired distance are in a progressive increase relationship.

The above-mentioned acquiring the distance between the display screen and the human eyes comprises: sensing whether the acquired distance is equal to a pre-set distance; when the acquired distance is not equal to the pre-set distance, determining an offset of the acquired distance with respect to the pre-set distance; and calculating the acquired distance using the offset and the pre-set distance.

The above-mentioned adjusting the caption font size of the video being displayed on the mobile terminal according to the acquired distance comprises: determining a caption font size corresponding to the pre-set distance interval, wherein the acquired distance is in the range of the pre-set distance interval; and adjusting the caption font size of the video being displayed on the mobile terminal to the determined caption font size corresponding to the pre-set distance interval.

When adjusting the caption font size of the video being displayed on the mobile terminal according to the acquired distance, the method further comprises: adjusting a volume size of the video being displayed on the mobile terminal according to the acquired distance, wherein the volume and the acquired distance are in a progressive increase relationship.

The above-mentioned adjusting the volume of the video being displayed on the mobile terminal according to the acquired distance comprises: determining a volume size corresponding to the pre-set distance interval, wherein the acquired distance is in the range of the pre-set interval; and adjusting the volume size of the video being displayed on the mobile terminal to the determined volume size corresponding to the pre-set distance interval.

According to another aspect of the disclosure, a device for displaying a video being displayed on a mobile terminal is provided.

The device for displaying the video being displayed on the mobile terminal according to the disclosure comprises: an acquisition module configured to acquire a distance between a display screen of the mobile terminal which is displaying the video and human eyes watching the video being displayed on the mobile terminal; and a first regulation module configured to adjust a caption font size of the video being displayed on the mobile terminal according to the acquired distance, wherein the caption font size and the acquired distance are in a progressive increase relationship.

The above-mentioned acquisition module comprises: a sensing unit configured to sense whether the acquired distance is equal to a pre-set distance; a first determination unit configured to determine, when an output of the sensing unit is no, the offset of the acquired distance with respect to the pre-set distance; and a calculation unit configured to calculate the acquired distance using the offset and the pre-set distance.

The above-mentioned first regulation module comprises: a second determination unit configured to determine a caption font size corresponding to the pre-set distance interval, wherein the acquired distance is in the range of the pre-set distance interval; and a first regulation unit configured to adjust the caption font size of the video being displayed on the mobile terminal to the determined caption font size corresponding to the pre-set distance interval.

The above-mentioned device further comprises: a second regulation module configured to adjust a volume size of the video being displayed on the mobile terminal according to the acquired distance, wherein the volume size and the acquired distance are in a progressive increase relationship.

The above-mentioned second regulation module comprises: a third determination unit configured to determine a volume size corresponding to the pre-set distance interval, wherein the acquired distance is in the range of pre-set distance interval; and a second regulation unit configured to adjust the volume size of the video being displayed on the mobile terminal to the determined volume size corresponding to the pre-set distance interval.

By way of the disclosure, when a video is played on the mobile terminal, the distance between a display screen on which the video is displayed and human eyes watching the video is acquired in real time, and the caption font size of the video is adjusted in real time according to the acquired distance, if the screen gets close to the user, the caption font size of the video becomes small as the distance decreases; and if the screen gets away from the user, the caption font size of the video becomes big as the distance increases, thereby solving the problem in the traditional art that the caption font size of the video being displayed on the mobile terminal may not be adjusted adaptively with the change of the distance between the user and the display screen of the mobile terminal when the user watches the video on the mobile terminal, thus achieving the effect that the change in the distance between the display screen of the mobile terminal and the user does not influence the user when watching a caption of the video being displayed on the mobile terminal, and the user experience is improved.

BRIEF DESCRIPTION OF THE DRAWINGS

Drawings, provided for further understanding of the disclosure and forming a part of the specification, are used to explain the disclosure together with embodiments of the disclosure rather than to limit the disclosure. In the drawings.

DETAILED DESCRIPTION OF THE EMBODIMENTS

The disclosure is described below in detail by reference to the accompanying drawings in conjunction with embodiments. It needs to note that the embodiments of the present application and the features in the embodiments may be combined with each other if there is no conflict.

Figure 1:
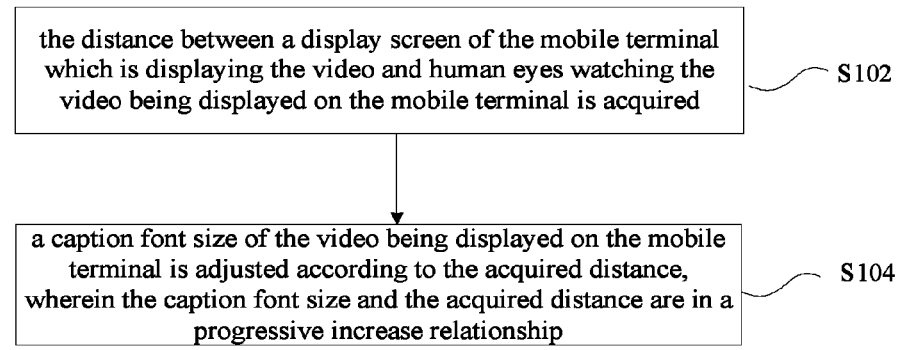
FIG. 1 is a flowchart of a method for displaying a video being displayed on a mobile terminal according to an embodiment of the disclosure.

FIG. 1 is a flowchart of a method for displaying a video being displayed on a mobile terminal according to an embodiment of the disclosure. As shown in FIG. 1, the method mainly comprises the following steps:

step S102: the distance between a display screen of the mobile terminal which is displaying the video and human eyes watching the video being displayed on the mobile terminal is acquired; and step S104: a caption font size of the video being displayed on the mobile terminal is adjusted according to the acquired distance, wherein the caption font size and the acquired distance are in a progressive increase relationship.

In the traditional art, the caption font size on the display screen of the mobile terminal may not be adjusted adaptively with the change of the distance between the user and the display screen of the mobile terminal when the user watches a video on the mobile terminal. By adopting the method as shown in FIG. 1, and on the basis of proximity sensing, the caption font size of the video being displayed on the mobile terminal may be changed dynamically according to the distance between the human eyes and the display screen of the mobile terminal, thereby greatly improving the user's visual experience.

In a preferred embodiment, a service software may be installed on the mobile terminal to serve as a management and control centre of the proximity sensing function, which is loaded into the starting item of the mobile terminal when the mobile terminal is powered on and is mainly responsible for monitoring and sensing the proximity sensing events of the terminal; and synchronizing, when the video play is started, image frames of the video player and caption frames of the service software to output a dynamic caption having a variable caption font size on an upper layer of the video player via the software.

Preferably, in step S102, acquiring the distance between the display screen of the mobile terminal which is displaying the video and the human eyes watching the video being displayed on the mobile terminal may comprise the following steps:

step S1: it is sensed whether the above-mentioned acquired distance is equal to a pre-set distance;

step S2: when the acquired distance is not equal to the pre-set distance, it is determined an offset of the acquired distance with respect to the pre-set distance; and step S3: it is calculated the acquired distance using the above-mentioned offset and the above-mentioned pre-set distance.

In the preferred embodiment, in order to acquire the distance between the human eyes watching the video being displayed on the mobile terminal and the display screen of the mobile terminal in real time, a default distance (i.e. the above-mentioned pre-set distance) between the human eyes and the display screen may generally be initialized, for example, 100 mm. Each time the distance between the human eyes and the display screen changes, the changed distance between the human eyes and screen may be calculated by means of acquiring an offset of the changing distance with respect to the default distance, that is, the direction of the mobile terminal getting far from the user is the positive direction, and the value of the offset is a positive value; while the direction of the mobile terminal getting close to the user is a negative direction, and the value of the offset is a negative value, thereby adjusting the caption font size of the video being displayed on the mobile terminal.

For example, the default distance between the human eyes watching the video being displayed on the mobile terminal and the display screen of the mobile terminal is set as 100 mm. When the mobile terminal moves towards the user by 50 mm, since the movement direction is in the negative direction, the offset with respect to the default distance is −50 mm. Thereby, it is calculated that the current distance between the human eyes and the display screen of the mobile terminal is 100+(−50)=50 mm. The caption font size of the video being displayed on the mobile terminal decreases due to the decreased distance between the human eyes and the screen.

Preferably, in step S104, adjusting the caption font size of the video being displayed on the mobile terminal according to the acquired distance may comprise the following steps:

step S4: it is determined a caption font size corresponding to a pre-set distance interval, wherein the acquired distance is in the range of the pre-set distance interval; and step S5: the caption font size of the video being displayed on the mobile terminal is adjusted to the determined caption font size corresponding to the pre-set distance interval.

In the preferred embodiment, a proximity sensing setting index table may be pre-stored in the mobile terminal, which is as shown in table 1,

TABLE 1

| | distance interval (millimeter) | | | |
|---|---|---|---|---|
| | <100 | 100-200 | 200-300 | >300 |
| font size (number) | 6 | 10 | 12 | 16 |
| volume size(grade) | 1 | 2 | 3 | 4 |

As described in the above embodiment, the default distance between the human eyes watching the video being displayed on the mobile terminal and the display screen of the mobile terminal is set as 100 mm; the default distance falls within the distance interval of 100 mm-200 mm, and thus the caption font size corresponding to the distance interval is number 10. Since the changed distance between the human eyes and the display screen of the mobile terminal is 50 mm, the current distance falls within the distance interval of <100 mm, and the caption font size corresponding to the distance interval is number 6.

It should be noted that the approach of the above-mentioned adjusting the caption font size of the video being displayed on the mobile terminal according to the acquired distance is not limited to looking up the proximity sensing setting index table, it may also comprise but not be limited to the following methods:

The first method: the default distance between the human eyes watching the video being displayed on the mobile terminal and the display screen of the mobile terminal is set as 100 mm, and the pre-set caption font size of the video is number 10, and each time the distance between the display screen of the mobile terminal and the human eyes decreases by 10 mm, the caption font size decreases by 1; while each time the distance between the display screen of the mobile terminal and the human eyes increases by 10 mm, the caption font size increases by 1.

The second method: the distance interval between the human eyes watching the video being displayed on the mobile terminal and the display screen of the mobile terminal increases in an equal difference manner (e.g., the difference value is 50 mm), and the caption font size of the video also increases in an equal difference manner (e.g., the difference value is 2), wherein the smallest font may be preset as number 8. For example, 0 mm-50 mm corresponds to number 8, 50 mm-100 mm corresponds to number 10, and 100 mm-150 mm corresponds to number 12.

Preferably, when performing step S104 of adjusting the caption font size of the video being displayed on the mobile terminal according to the acquired distance, the above-mentioned method may also comprise: the volume size of the video being displayed on the mobile terminal is adjusted according to the acquired distance, wherein the volume size and the acquired distance are in a progressive increase relationship.

Preferably, the above-mentioned adjusting the volume size of the video being displayed on the mobile terminal according to the acquired distance may comprise the following steps:

step S4: it is determined a volume size corresponding to the pre-set distance interval, wherein the acquired distance is within the pre-set distance interval; and step S5: the caption font size of the video being displayed on the mobile terminal is adjusted to the volume size corresponding to the pre-set distance interval.

In the preferred embodiment, as shown in the above-mentioned table 1, the default distance between the human eyes watching the video being displayed on the mobile terminal and the display screen of the mobile terminal is set as 100 mm; the default distance falls within the distance interval of 100 mm-200 mm, and thus the volume size corresponding to the distance interval is grade 2. If the changed distance between the human eyes and the display screen of the mobile terminal is 50 mm, the current distance falls within the distance interval of <100 mm, and the volume size corresponding to the distance interval is grade 1.

It should be noted that the methods of the above-mentioned adjusting the volume size of the video being displayed on the mobile terminal according to the acquired distance is not limited to looking up the proximity sensing setting index table, but may also comprise but not be limited to the following methods:

The first method, the default distance between the human eyes watching the video being displayed on the mobile terminal and the display screen of the mobile terminal is set as 100 mm, and the pre-set volume size of the video is grade 2, and each time the distance between the display screen of the mobile terminal and the human eyes decreases by 50 mm, the volume size decreases by 1; while each time the distance between the display screen of the mobile terminal and the human eyes increases by 50 mm, the volume size increases by 1.

The second method, the distance interval between the human eyes watching the video being displayed on the mobile terminal and the display screen of the mobile terminal increases in an equal difference manner (e.g., the difference value is 50 mm), and the volume size of the video also increases in an equal difference manner (e.g., the difference value is grade 2), wherein the smallest grade may be preset as grade 1. For example, 0 mm-50 mm corresponds to grade 1, 50 mm-100 mm corresponds to grade 3, and 100 mm-150 mm corresponds to grade 5.

The above-mentioned preferred embodiment is further described below in accordance with FIG. 2.

Figure 2:
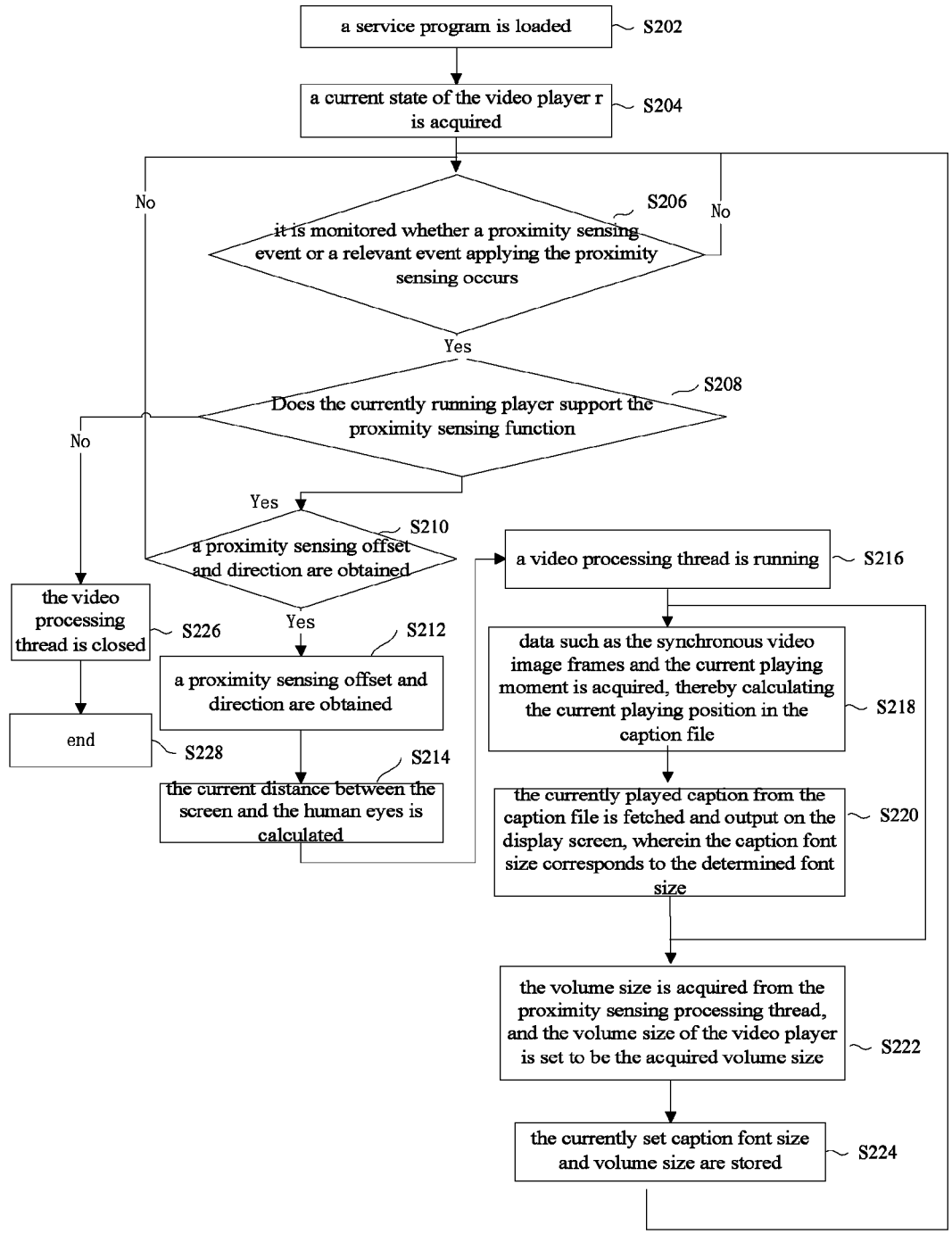
FIG. 2 is a flowchart of a method for displaying a video being displayed on a mobile terminal according to a preferred embodiment of the disclosure.

FIG. 2 is a flowchart of a method for displaying a video being displayed on the mobile terminal according to a preferred embodiment of the disclosure. As shown in FIG. 2, the flow may comprise the following processing steps.

step S202: a service program is loaded, and the service program is added into the powering-on starting task item. After the mobile terminal is powered on, the service program which runs in the background is loaded, wherein the service program is equivalent to a control centre;

step S204: a current state of the video player running in the foreground of the mobile terminal is acquired; and if the player is currently in a running state or a paused state, the proximity sensing processing thread is running;

step S206: it is monitored whether a proximity sensing event or a relevant event applying the proximity sensing occurs; and if yes, perform the step S208; and if no, continue monitoring.

In the preferred embodiment, the proximity sensing event may be monitored through the mobile terminal sensing the output signal of the proximity sensor.

Step S208: it is detected whether the currently running player supports the proximity sensing function; and if yes, continue performing the next step; and if no, turn to step S226.

Figure 3:
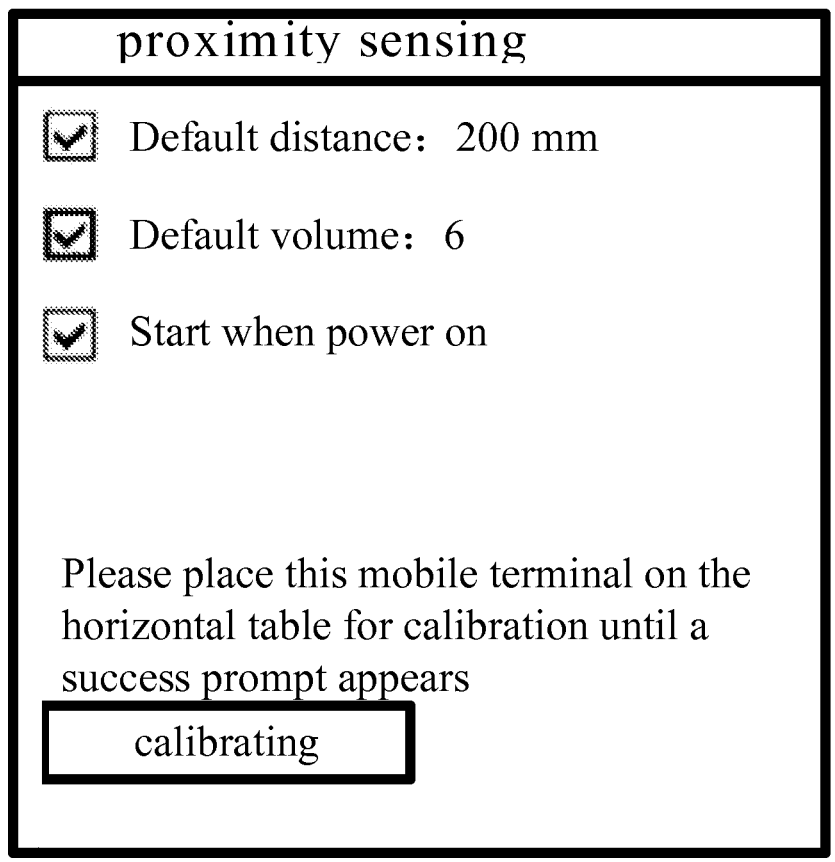
FIG. 3 is a schematic diagram of an initialization setting interface for a video being displayed on a mobile terminal according to a preferred embodiment of the disclosure.

In the preferred embodiment, FIG. 3 is a schematic diagram of an initialization setting interface of the video being displayed on the mobile terminal according to a preferred embodiment of the disclosure. As shown in FIG. 3, in order to better control the proximity sensing function and enhance user experiences, in the preferred embodiment, the default distance between the human eyes and the display screen and an initialization volume size of the video being displayed on the mobile terminal may be set according to user requirements; and while the proximity sensing function is set, a necessary calibration may be conducted on the proximity sensing function.

Step S210: proximity sensing data in the processing proximity sensing thread is processed, a proximity sensing offset and direction are obtained; and if the offset does not exceed an original distance interval, turn to step S206; and if the offset exceeds the original distance interval, continue to perform the step S212;

step S212: the offset of the changed distance between the screen and human eyes with respect to the pre-set distance is obtained;

step S214: the current distance between the screen and the human eyes is calculated so as to adjust the caption font size and volume size;

step S216: a video processing thread is running, wherein the thread is mainly used for performing a further operation according to the data obtained in the proximity sensing thread;

step S218: data such as the synchronous video image frames and the current playing moment is acquired, thereby calculating the current playing position in the caption file;

step S220: the currently played caption from the caption file is fetched and output on the display screen, wherein the caption font size corresponds to the determined font size. Meanwhile, return to step S218;

step S222: the volume size is acquired from the proximity sensing processing thread, and the volume size of the video player is set to be the acquired volume size;

step S224: the currently set caption font size and volume size are stored, and meanwhile, return to step S206;

step S226: the video processing thread is closed; and step S228: the proximity sensing monitoring is ended.

In the preferred embodiment, the running state of the foreground video player is monitored all the time via an endless loop, and it is realised that the caption and volume of the video player is controlled dynamically according to the detected proximity sensing data.

Figure 4:
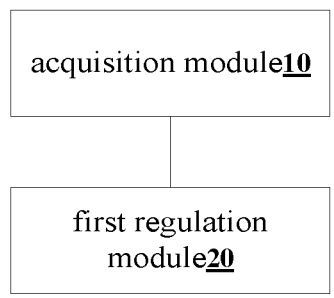
FIG. 4 is a structural block diagram of a device for displaying a video being displayed on a mobile terminal according to an embodiment of the disclosure.

FIG. 4 is a structural block diagram of a device for displaying the video being displayed on a mobile terminal according to an embodiment of the disclosure. As shown in FIG. 4, the device for displaying a video being displayed on the mobile terminal mainly comprises: an acquisition module 10, which is configured to acquire a distance between a display screen of the mobile terminal which is displaying the video and human eyes watching the video being displayed on the mobile terminal; and a first regulation module 20, which is configured to adjust a caption font size of the video being displayed on the mobile terminal according to the obtained distance, wherein the caption font size and the obtained distance are in a progressive increase relationship.

By adopting the device as shown in FIG. 4, the problem in the traditional art that the caption font size of the video being displayed on the mobile terminal may not be adjusted adaptively with the change of the distance between the user and the display screen of the mobile terminal when the user watches the video on the mobile terminal is solved, and it is realised that in the process of the user watching the video being displayed on the mobile terminal, the mobile terminal may dynamically determine the caption font size and volume size suitable for watching according to the real-time changes of the distance between the screen and the human eyes, thereby effectively improving the users' multimedia experiences.

Figure 5:
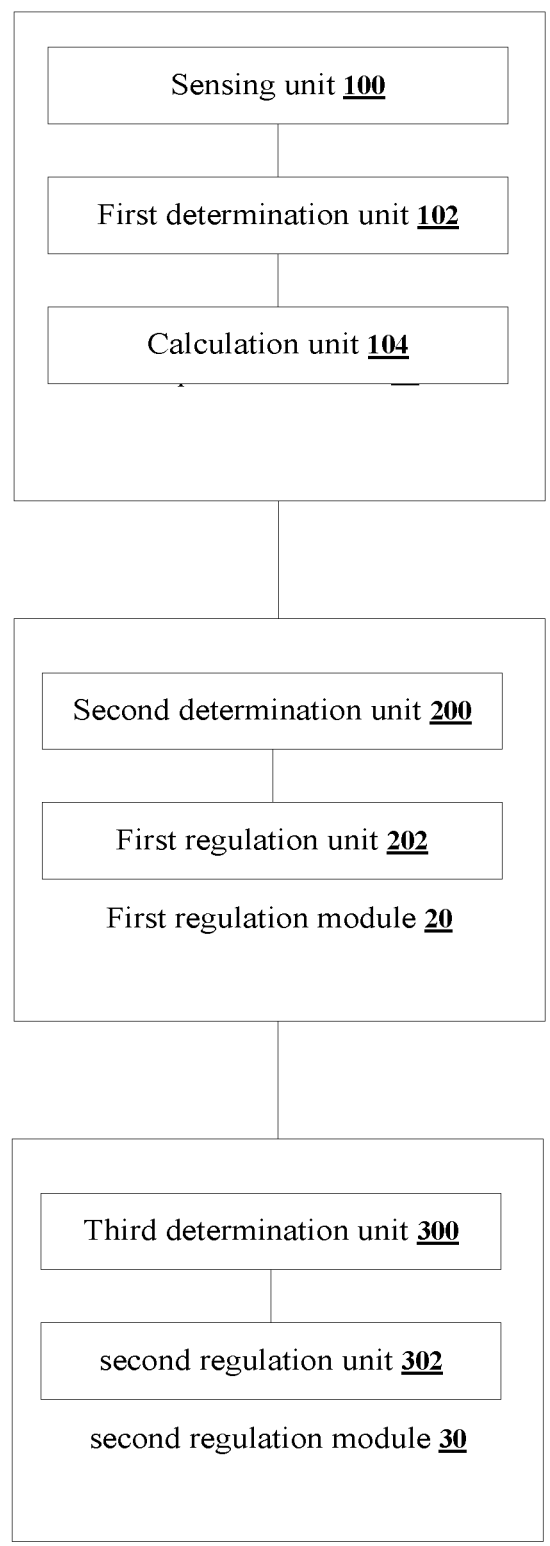
FIG. 5 is a structural block diagram of a device for displaying a video being displayed on a mobile terminal according to a preferred embodiment of the disclosure.

Preferably, as shown in FIG. 5, the above-mentioned acquisition module 10 may comprise: a sensing unit 100, which is configured to sense whether the acquired distance is equal to a pre-set distance; a first determination unit 102, which is configured to determine, when an output of the sensing unit is no, the offset of the acquired distance with respect to the pre-set distance; and a calculation unit 104, which is configured to calculate the acquired distance using the offset and the pre-set distance.

Preferably, as shown in FIG. 5, the above-mentioned first regulation module 20 may comprise: a second determination unit 200, which is configured to determine a caption font size corresponding to the pre-set distance interval, wherein the acquired distance is within the pre-set distance interval; and a first regulation unit 202, which is configured to adjust the caption font size of the video being displayed on the mobile terminal to the caption font size corresponding to the pre-set distance interval.

Preferably, as shown in FIG. 5, the above-mentioned device may further comprise: a second regulation module 30, which is configured to adjust a volume size of the video being displayed on the mobile terminal according to the acquired distance, wherein the volume size and the acquired distance are in a progressive increase relationship.

Preferably, as shown in FIG. 5, the above-mentioned second regulation module 30 may comprise: a third determination unit 300, which is configured to determine the volume size corresponding to the pre-set distance interval, wherein the acquired distance is within the pre-set distance interval; and a second regulation unit 302, which is configured to adjust the caption font size of the video being displayed on the mobile terminal to the volume size corresponding to the pre-set distance interval.

Reference may be made to the preferred embodiment in FIGS. 1 to 3 for the preferred working mode of the above-mentioned modules and units with respect to one another, which is not described herein again.

Figure 6:
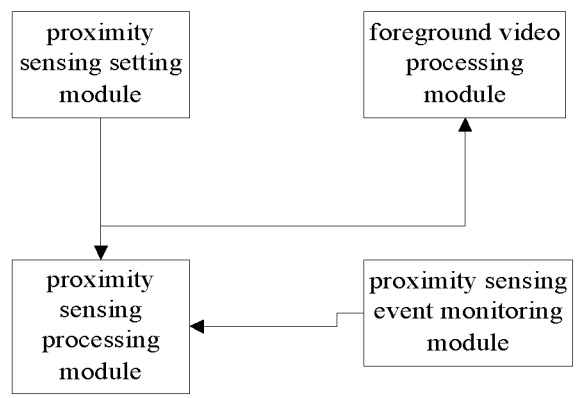
FIG. 6 is a schematic diagram of a device for displaying a video being displayed on a mobile terminal according to a preferred embodiment of the disclosure.

FIG. 6 is a schematic diagram of a device for displaying a video being displayed on the mobile terminal according to a preferred embodiment of the disclosure. As shown in FIG. 6, after being loaded, a service program may monitor the video player state and the proximity sensing state all the time via the endless loop and the multi-thread technology, so as to dynamically change the caption font size and the volume size during the video playing according to the proximity sensing state. The service program may also set an initial distance and volume via the above-mentioned setting page as shown in FIG. 3, and the user may flexibly configure his or her own preferred distance and volume, thereby having good availability. A proximity sensing event monitoring module (equivalent to the above-mentioned sensing unit) is configured to send out an indication to a proximity sensing processing module upon monitoring a proximity sensing event or a relevant event applying the proximity sensing; a proximity sensing setting module is configured to provide initialization settings of the proximity sensing function, for example, the default distance and the default volume, and save same to a file; the proximity sensing processing module (equivalent to the above-mentioned first determination unit, calculation unit, second determination unit and third determination unit) is configured to process the received proximity sensing data, detect whether the caption size and volume size need to be changed, and calculate parameters such as the size needing to be changed for use of a foreground video processing module; and the foreground video processing module (equivalent to the first regulation unit and the second regulation unit) dynamically adjusts the changes of the caption font size and playing volume output synchronously according to the data calculated by the proximity sensing processing module.

From the above-mentioned description, it may be seen that the above-mentioned embodiments achieve the following technical effects (it should be noted that these effects are the effects which may be achieved by some preferred embodiments): in the process of watching the video, the user does not need to click the keys or touch the screen, the mobile terminal may dynamically adjust the caption font size and volume size suitable for the use of the current video according to the changes of the distance between the human eyes and the display screen, thereby effectively improving the user's experiences.

Apparently, those skilled in the art shall understand that the above modules and steps of the disclosure may be realized by using general purpose calculating device, may be integrated in one calculating device or distributed on a network which consists of a plurality of calculating devices, and alternatively they may be realized by using the executable program code of the calculating device, so that consequently they may be stored in the storing device and executed by the calculating device, in some cases, may perform the shown or described step in sequence other than herein, or they are made into integrated circuit module respectively, or a plurality of modules or steps thereof are made into one integrated circuit module. In this way, the disclosure is not restricted to any particular hardware and software combination.

The above description is only preferred embodiments of the disclosure and is not intended to limit the disclosure, and the disclosure may have a variety of changes and modifications for ordinary person skilled in the field. Any modification, equivalent replacement, or improvement made within the spirit and principle of the disclosure shall all fall within the protection scope of the disclosure.

What is claimed is:

1. A method for displaying a video on a mobile terminal, comprising:
    acquiring a distance between a display screen of the mobile terminal which is displaying the video and human eyes watching the video being displayed on the mobile terminal; and
    adjusting a caption font size of the video being displayed on the mobile terminal according to the acquired distance, wherein the caption font size and the acquired distance are in a progressive increase relationship;
    wherein
    a default distance between the human eyes watching the video being displayed on the mobile terminal and the display screen of the mobile terminal is set as 100 mm, and a pre-set volume size of the video is grade 2, and each time the distance between the display screen of the mobile terminal and the human eyes decreases by 50 mm, the volume size decreases by 1; while each time the distance between the display screen of the mobile terminal and the human eyes increases by 50 mm, the volume size increases by 1; or
    the distance interval between the human eyes watching the video being displayed on the mobile terminal and the display screen of the mobile terminal increases in an equal difference manner, and the volume size of the video also increases in an equal difference manner, wherein the distance interval, which is in a range of 0 mm-50 mm, corresponds to the volume size which is grade 1, distance interval, which is in a range of 50 mm-100 mm corresponds to the volume size which is grade 3, and distance interval, which is in a range of 100 mm-150 mm corresponds to the volume size which is grade 5.

2. The method according to claim 1, wherein acquiring the distance between the display screen and the human eyes comprises:
    sensing whether the acquired distance is equal to a pre-set distance;
    if the acquired distance is not equal to the pre-set distance, determining an offset of the acquired distance with respect to the pre-set distance; and
    calculating the acquired distance using the offset and the pre-set distance.

3. The method according to claim 1, wherein adjusting the caption font size of the video being displayed on the mobile terminal according to the acquired distance comprises:
    determining a caption font size corresponding to the pre-set distance interval, wherein the acquired distance is in the range of the pre-set distance interval; and
    adjusting the caption font size of the video being displayed on the mobile terminal to the determined caption font size corresponding to the pre-set distance interval.

4. The method according to claim 1, wherein when adjusting the caption font size of the video being displayed on the mobile terminal according to the acquired distance, the method further comprises:
    adjusting a volume size of the video being displayed on the mobile terminal according to the acquired distance, wherein the volume and the acquired distance are in a progressive increase relationship.

5. The method according to claim 4, wherein adjusting the volume of the video being displayed on the mobile terminal according to the acquired distance comprises:
    determining a volume size corresponding to the pre-set distance interval, wherein the acquired distance is in the range of the pre-set distance interval; and
    adjusting the volume size of the video being displayed on the mobile terminal to the determined volume size corresponding to the pre-set distance interval.

6. A device for displaying a video on a mobile terminal, comprising:
    an acquisition module configured to acquire a distance between a display screen of the mobile terminal which is displaying the video and human eyes watching the video being displayed on the mobile terminal; and
    a first regulation module configured to adjust a caption font size of the video being displayed on the mobile terminal according to the acquired distance, wherein the caption font size and the acquired distance are in a progressive increase relationship;
    wherein
    a default distance between the human eyes watching the video being displayed on the mobile terminal and the display screen of the mobile terminal is set as 100 mm, and a pre-set volume size of the video is grade 2, and each time the distance between the display screen of the mobile terminal and the human eyes decreases by 50 mm, the volume size decreases by 1; while each time the distance between the display screen of the mobile terminal and the human eyes increases by 50 mm, the volume size increases by 1; or the distance interval between the human eyes watching the video being displayed on the mobile terminal and the display screen of the mobile terminal increases in an equal difference manner, and the volume size of the video also increases in an equal difference manner, wherein the distance interval, which is in a range of 0 mm-50 mm, corresponds to the volume size which is grade 1, distance interval, which is in a range of 50 mm-100 mm corresponds to the volume size which is grade 3, and distance interval, which is in a range of 100 mm-150 mm corresponds to the volume size which is grade 5.

7. The device according to claim 6, wherein the acquisition module comprises:
- a sensing unit configured to sense whether the acquired distance is equal to a pre-set distance;
- a first determination unit configured to determine, when an output of the sensing unit is no, an offset of the acquired distance with respect to the pre-set distance; and
- a calculation unit configured to calculate the acquired distance using the offset and the pre-set distance.

8. The device according to claim 6, wherein the first regulation module comprises:
- a second determination unit configured to determine a caption font size corresponding to the pre-set distance interval, wherein the acquired distance is in the range of the pre-set distance interval; and
- a first regulation unit configured to adjust the caption font size of the video being displayed on the mobile terminal to the determined caption font size corresponding to the pre-set distance interval.

9. The device according to claim 6, wherein the device further comprises:
- a second regulation module configured to adjust a volume size of the video being displayed on the mobile terminal according to the acquired distance, wherein the volume size and the acquired distance are in a progressive increase relationship.

10. The device according to claim 9, wherein the second regulation module comprises:
- a third determination unit configured to determine a volume size corresponding to the pre-set distance interval, wherein the acquired distance is in the range of pre-set distance interval; and
- a second regulation unit configured to adjust the volume size of the video being displayed on the mobile terminal to the determined volume size corresponding to the pre-set distance interval.

* * * * *